(12) United States Patent
Dickinson et al.

(10) Patent No.: US 6,643,573 B2
(45) Date of Patent: Nov. 4, 2003

(54) METHOD FOR AUTOMATICALLY ADJUSTING REFERENCE MODELS IN VEHICLE STABILITY ENHANCEMENT (VSE) SYSTEMS

(75) Inventors: John E. Dickinson, Brighton, MI (US); Hsien H. Chen, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/080,062

(22) Filed: Feb. 19, 2002

(65) Prior Publication Data

US 2003/0158641 A1 Aug. 21, 2003

(51) Int. Cl.[7] .............................. B62D 6/00; G06F 7/00
(52) U.S. Cl. ..................................................... 701/41
(58) Field of Search ............................ 701/41, 45, 48, 701/70, 73; 180/446, 444, 443; 700/40

(56) References Cited

U.S. PATENT DOCUMENTS

| | | | |
|---|---|---|---|
| 4,842,089 A | 6/1989 | Kimbrough et al. | 180/79.1 |
| 5,720,533 A | 2/1998 | Pastor et al. | 303/147 |
| 5,746,486 A | 5/1998 | Paul et al. | 303/146 |
| 5,941,919 A | 8/1999 | Pastor et al. | 701/36 |
| 6,035,251 A | 3/2000 | Hac et al. | 701/70 |
| 6,212,461 B1 | 4/2001 | Ghoneim et al. | 701/70 |
| 6,282,479 B1 | 8/2001 | Ghoneim et al. | 701/70 |
| 6,466,857 B1 * | 10/2002 | Belvo | 701/82 |
| 6,499,559 B2 * | 12/2002 | Mc Cann et al. | 180/446 |

OTHER PUBLICATIONS

Hsien H. Chen, "Performance Limits of Front–Augmented Steer and Rear–Wheel Steer Systems," Aug. 10, 1999, pp. 1–16.
Youssef A. Ghoneim, William C. Lin, David M. Sidlosky, Hsien H. Chen, Yuen–Kwok Chin and Michael J. Tedrake, "Integrated Chassis Control System to Enhance Vehicle Stability," *International Journal of Vehicle Design*, vol. 23, Nos. 1/2, 2000, pp. 124–144.
Thomas D. Gillespie, *Fundamentals of Vehicle Dynamics*, 1992, pp. 199–202, & 301–302.

* cited by examiner

*Primary Examiner*—Yonel Beaulieu
(74) *Attorney, Agent, or Firm*—Scott A. McBain

(57) ABSTRACT

A method for automatically adjusting a vehicle stability enhancement (VSE) system. The VSE system is used in conjunction with a steering system having a plurality of driver-selectable steering modes associated therewith. The method includes configuring a reference model within the VSE system to generate desired vehicle handling aspects, the desired vehicle handling aspects being a function of one or more driver inputs to the steering system. Then, a determination is made as to which of the plurality of driver-selectable steering modes is activated, wherein each of the desired vehicle handling aspects generated is made further dependent upon a specific steering mode selected, and wherein the desired vehicle handling aspects include a desired steady state yaw rate; and the one or more driver inputs includes an effective road wheel position.

20 Claims, 6 Drawing Sheets

US 6,643,573 B2

METHOD FOR AUTOMATICALLY ADJUSTING REFERENCE MODELS IN VEHICLE STABILITY ENHANCEMENT (VSE) SYSTEMS

BACKGROUND

The present disclosure relates generally to automobile steering systems and, more particularly, to a method for automatically adjusting reference models used by vehicle stability enhancement systems in response to a change in steering mode.

Certain Vehicle Stability Enhancement (VSE) systems currently in existence typically employ a "Reference Model" algorithm that calculates a desirable handling motion for the vehicle. Such reference model algorithms have historically assumed that the desirable handling motion of the vehicle is solely a function of handwheel angle and vehicle speed. However, with the advent of new vehicle systems such as four-wheel steering, rear wheel steering, front controlled steering, active roll control and the like, the desirable handling motion may change when the new system state changes (e.g., as a result of driver preference changes or initial system activation). Thus, the existing reference models are typically not sufficient for use in a VSE system with multiple modes of steering, wherein each steering mode may have different desirable handling responses associated therewith. "Driver's preference" is a feature available in certain electric front controlled, rear controlled or fourwheel automobile steering systems. A driver's preference switch may include settings such as "sporty", "normal", "trailering", "system off", or other modes representing various vehicle-handling objectives.

In early development of procedures to provide vehicle dynamic stability certain Vehicle Stability Enhancement (VSE) systems, employ separate look-up tables for the "Reference Model" algorithm that calculates a desirable handling motion (e.g., desired yaw rate) for the vehicle when operating in two wheel, normal four wheel or special trailer mode control for the rear wheels. When a change in the open-loop rear steer angle command was made to provide a different driver "feel" based upon customer preferences, the look-up table had to be re-tuned to the new performance characteristic.

This design approach increased the size of computer memory used for tabular data storage and computational selection of each variation possible. Moreover, under this older design approach the development cycle was slowed because new calibrations for the look-up table were required whenever changes were made to the Vehicle Stability Enhancement (VSE) systems.

SUMMARY

The above discussed and other drawbacks and deficiencies of the prior art are overcome or alleviated by a method for automatically adjusting a vehicle stability enhancement (VSE) system, the VSE system used in conjunction with a steering system having a plurality of driver-selectable steering modes associated therewith. In an exemplary embodiment, the method includes configuring a reference model within the VSE system to generate desired vehicle handling aspects, the desired vehicle handling aspects being a function of one or more driver inputs to the steering system. Then, a determination is made as to which of the plurality of driver-selectable steering modes is activated, wherein each of the desired vehicle handling aspects generated is made further dependent upon a specific steering mode selected and wherein the desired vehicle handling aspects comprise a desired steady state yaw rate; and the driver inputs include an effective road wheel position.

In a preferred embodiment, desired vehicle handling aspects include a desired steady state yaw rate. The one or more driver inputs further include a handwheel angle (HWA) and a vehicle speed. In one embodiment, the method further includes configuring a lookup table for generating each of the desired vehicle handling aspects, wherein each lookup table is configured to include entries corresponding to a selected steering mode. The lookup table corresponding to the desired steady state yaw rate has the effective road wheel position as a first input thereto, and the vehicle speed as a second input thereto.

BRIEF DESCRIPTION OF THE DRAWINGS

Referring to the exemplary drawings wherein like elements are numbered alike in the several Figures.

DETAILED DESCRIPTION

The above discussed and other drawbacks and deficiencies of the prior art are overcome or alleviated by a method for automatically adjusting a vehicle stability enhancement (VSE) system, the VSE system used in conjunction with a steering system having a plurality of driver-selectable steering modes associated therewith. In an exemplary embodiment, the method includes configuring a reference model within the VSE system to generate desired vehicle handling aspects, the desired vehicle handling aspects being a function of one or more driver inputs to the steering system. Then, a determination is made as to which of the plurality of driver-selectable steering modes is activated, wherein each of the desired vehicle handling aspects generated is made further dependent upon a specific steering mode selected.

In an exemplary embodiment, desired vehicle handling aspects further include a desired steady state yaw rate, a desired steady state sideslip, a desired damping ratio, and a desired natural frequency. The one or more driver inputs further include a handwheel angle (HWA) and a vehicle speed. Moreover, the method further includes configuring a set of lookup tables for generating each of the desired vehicle handling aspects, wherein each lookup table within the set of lookup tables is individually tuned so as to correspond to the specific steering mode selected. Such a method is disclosed in commonly assigned U.S. patent application Ser. No. 09/XXX,XXX, the contents of which are incorporated by reference herein in their entirety.

In another a method disclosed herein in another exemplary embodiment, a single look-up table is employed for all expected variations of the "Reference Model" algorithm in this instance, that employed for steady state yaw rate, that calculates a desirable handling motion for the vehicle when operating in two wheel, normal four wheel or special trailer mode control for the rear wheels rear steer operation. This could reduce the calibration memory size by 330 bytes. In addition the resultant look-up table would only need to be re-calibrated if the vehicle dynamic characteristics e.g., cornering stiffness, was altered through a design change or if substantially different characteristic tires were mounted on the vehicle.

Table Selection

Figure 1:
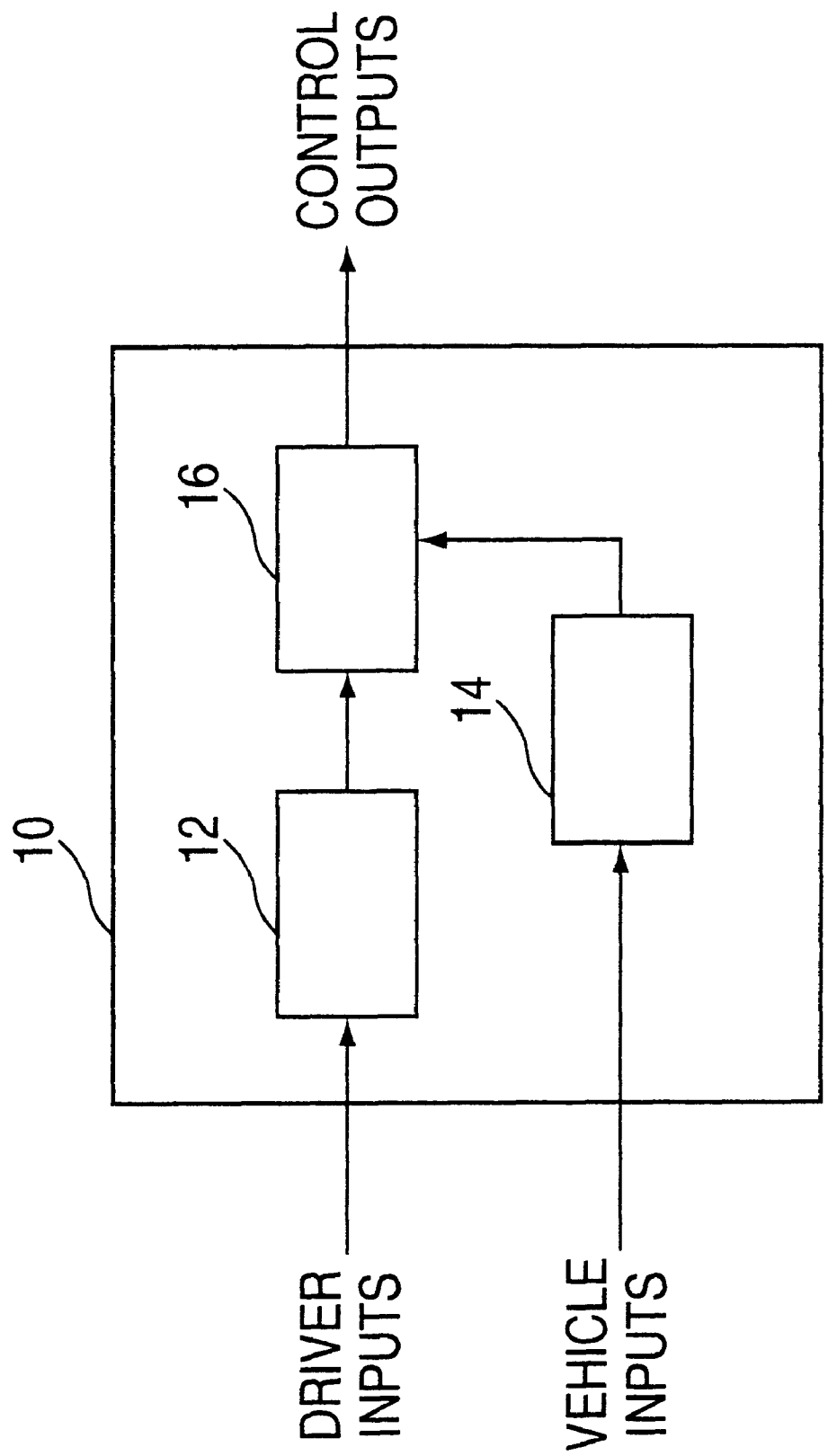
FIG. 1 is a block diagram representative of an exemplary Vehicle Stability Enhancement (VSE) system.

Referring initially to FIG. 1, there is shown a simplified block diagram of an exemplary Vehicle Stability Enhancement (VSE) system 10. The VSE system 10 provides closed-loop, yaw rate control to achieve vehicle stability objectives. In addition to open-loop driver inputs, the system 10 also uses vehicle inputs to generate the control outputs applied therein. As is shown in FIG. 1, the driver inputs (e.g., handwheel position, vehicle speed) are sent through a vehicle reference model 12. As will be described in further detail, the vehicle reference model 12 uses a reference model algorithm to generate desired vehicle handling aspects such as desired yaw rate and sideslip. The various vehicle inputs (e.g., sensed yaw rate, lateral acceleration) are sent through a vehicle state estimator 14 that, in addition to filtering sensed inputs, also provides other parameter estimation outputs that are not directly measured through sensing means. The outputs of both the vehicle reference model 12 and the vehicle state estimator 14 are inputted to vehicle control block 16 that ultimately provides the control outputs.

Figure 2:
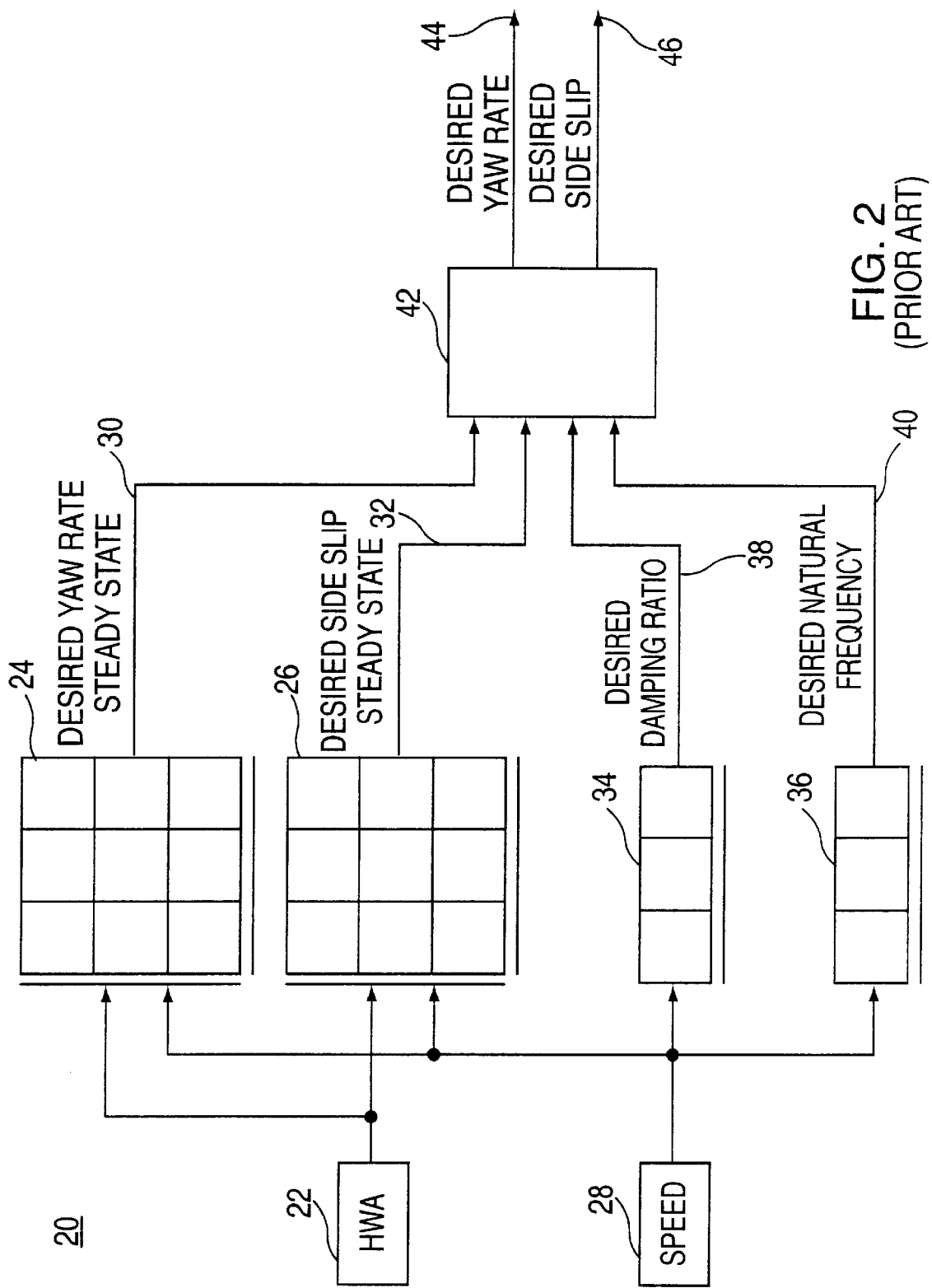
FIG. 2 is a block diagram that represents an existing VSE reference model algorithm used within a VSE system.

FIG. 2 is a block diagram that represents an existing VSE reference model algorithm 20 found in the vehicle reference model 12. The existing algorithm 20 uses lookup tables to determine four aspects of the desirable handling motion, specifically (1) a desired yaw rate; (2) a desired sideslip, (3) a desired damping ratio, and (4) a desired natural frequency. As shown in FIG. 2, algorithm 20 inputs the handwheel angle (HWA) 22 to lookup tables 24 and 26. In addition, the vehicle speed 28 is also inputted into lookup tables 24 and 26. The output of lookup table 24 is a desired, steady state yaw rate 30. The output of lookup table 26 is a desired, steady state sideslip 32. In addition, the vehicle speed 28 is further inputted into lookup tables 34 and 36. The output from lookup table 34 yields the desired damping ratio 38, and the output from lookup table 36 yields the desired natural frequency 40. Then, each of the lookup table outputs, are inputted into a filter 42 to produce a desired, dynamic yaw rate 44 and a desired, dynamic sideslip 46. These dynamic handling aspects are, among other inputs, used by the control block 16 in FIG. 1 to ultimately generate control outputs.

As indicated previously, a vehicle's handling response will change according to the particular driver's preference selected. These changes in handling response should correspondingly be reflected in the reference model 12 of the VSE system 10. Accordingly, the reference model algorithm 20 should therefore be updated to accommodate new, multi-mode steering systems by providing the flexibility for automatic adjustment of the calculation for the desirable handling motion for a given mode of operation. Furthermore, such automatic adjustments to the VSE reference model 12 should accommodate vehicle systems such as four-wheel steering, front controlled steering, and active roll control.

Therefore, in accordance with an exemplary embodiment, there is disclosed herein a method for automatically adjusting the reference models used vehicle stability enhancement systems in response to a change in steering mode. The method includes, in one aspect, expanding the existing reference model structure in the VSE system 10 to include multiple lookup tables for each of the four desired handling aspects, with each lookup table tuned to match a specific mode of operation. The method also includes in yet another aspect, expanding the existing reference model structure in the VSE system 10 to include just a single lookup table, if the input parameters are re-characterized.

Figure 3:
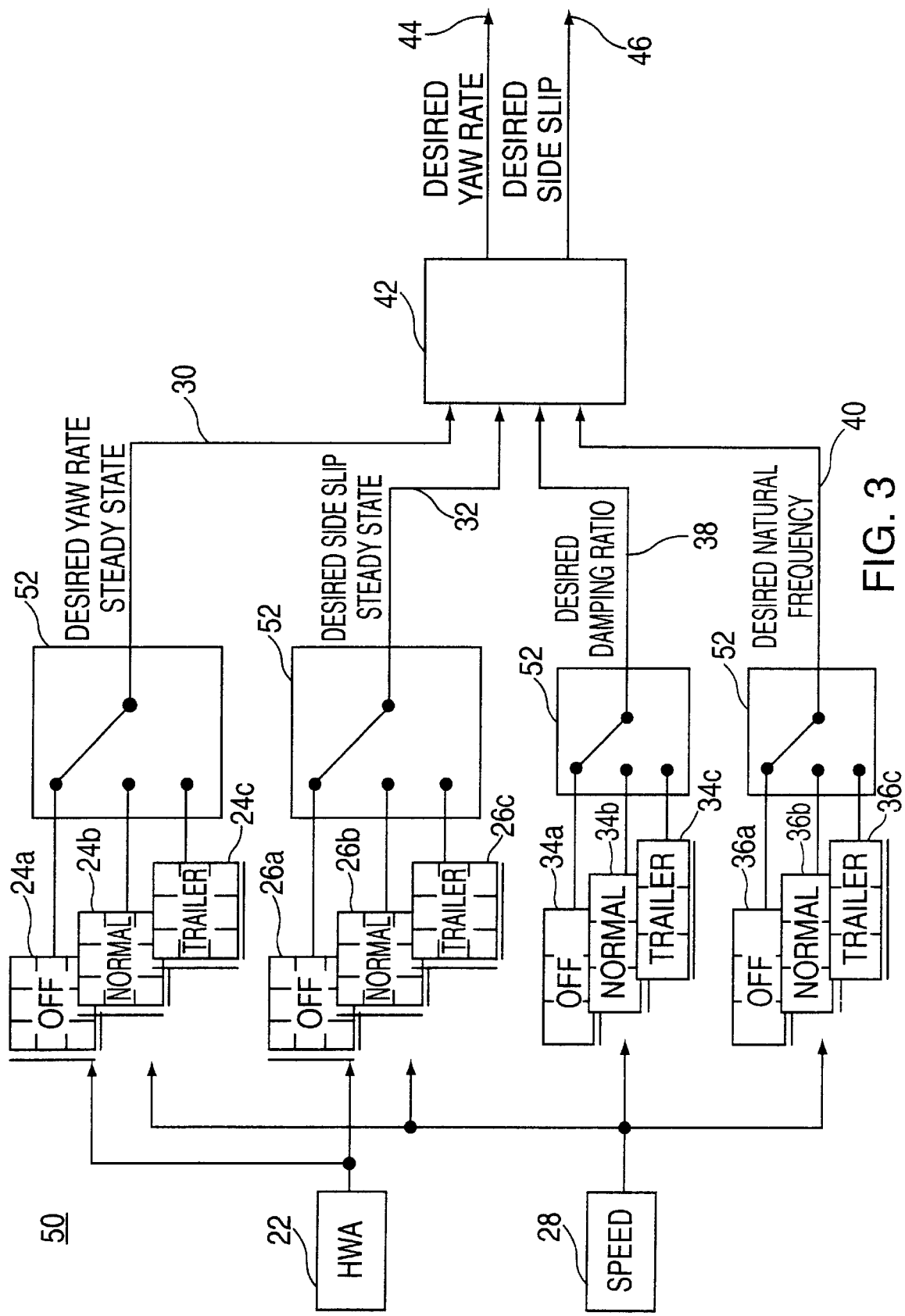
FIG. 3 is a block diagram that represents a modified VSE reference model algorithm, in accordance with an embodiment of the invention.

Referring now to FIG. 3, there is shown block diagram that represents a modified VSE reference model algorithm 50. As can be seen, each of the lookup table outputs; desired steady state yaw rate 30, desired steady state sideslip 32, desired damping ratio 38 and desired natural frequency 40 are connected to a selector switch 52 that may be selectively coupled to one of three sets of lookup tables.

By way of example, the algorithm 50 of FIG. 3 illustrates three separate lookup tables representing three different modes of operation for a four-wheel steering system. In the example illustrated, one set of tables is tuned for an "Off Mode", another set is tuned for a "Normal Mode", and a third set is tuned for a "Trailer Mode". However, those skilled in the art will appreciate that algorithm 50 may be further expanded to accommodate additional sets of lookup tables for systems having additional modes with differing handling characteristics.

The algorithm 50 dynamically determines which set of lookup tables to use based on the state of, for example, a four-wheel steering system. In this manner, the reference model calculations are automatically adjusted so as to match the handling motion of the vehicle based on the selected mode of the steering system. As is shown in FIG. 3, the desired steady state yaw rate 30 is generated by using the specific look up table (24a, 24b or 24c) that corresponds to the mode in which the steering system is currently operating. The selected mode of the steering system determines the relationship between HWA and rear wheel angle (RWA) as a function of vehicle speed. This relationship, in turn, determines the corresponding relationship between HWA and observed yaw rate. In order to tune the specific lookup table (e.g., 24a, 24b or 24c) that takes the vehicle speed 28 and HWA 22 and produces the desired, steady state yaw rate 30, vehicle tests are performed with the appropriate relationship between HWA 22 and RWA in place. For each possible relationship between HWA 22 and RWA, a separate table is kept in the vehicle reference model portion of the control system. These tables are then appropriately switched according to the operating mode of the steering system.

Similarly, the desired steady state sideslip 32 is also generated by using by using the specific lookup table (26a, 26b or 26c) that corresponds to the mode in which the steering system is currently operating. The same is true with respect to desired damping ratio 38 (associated with lookup tables 34a, 34b and 34c) and desired natural frequency 40 (associated with lookup tables 36a, 36b and 36c).

In the vehicle development process, the characteristic relationship between the HWA 22 and RWA is often revised. In such a case, the corresponding lookup tables are subsequently regenerated, thereby resulting in significant vehicle development time and effort. Since separate lookup tables are now used for each of the modes of the steering system, any such changes may result in even further development time and effort.

Figure 4:
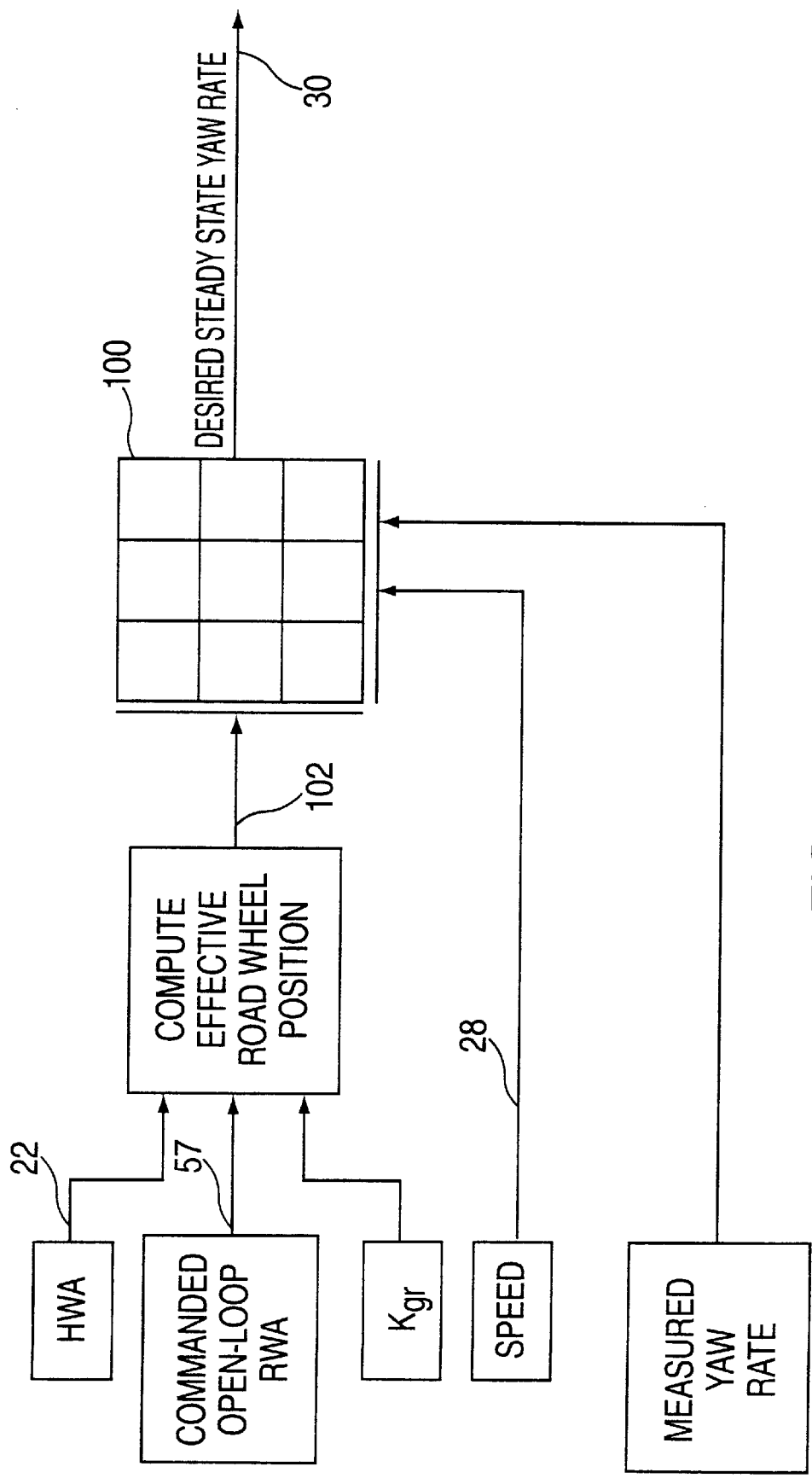
FIG. 4 is a block diagram of an alternative embodiment.

Therefore, as an alternative approach to using multiple tables to generate a value for desired yaw rate, the following implementation is proposed. Referring to FIG. 4 depicting an implementation of yet another exemplary embodiment of a VSE system 10, and specifically a yaw stability implementation, a table look-up 100 is executed directly to determine a value for the steady state yaw rate 30. In evaluation of vehicle performance, an expected yaw rate from the table look-up 100 may be compared to the actual measured yaw rate for a range of vehicle speeds and steering angle positions. Measured deviations from expected values are utilized to tune the table for altered vehicle characteristics due to suspension or tire changes, which can directly affect the cornering stiffness values for the vehicle (and are reflected in the value of the understeer gradient $K_{us}$). Unlike the embodiments disclosed earlier, which employ multiple look-up tables responsive to at least one of HWA 22, commanded open loop RWA 57, and vehicle speed 28, in the embodiment now disclosed, a single look-up table 100 is formulated and utilized to determine a desired steady state yaw rate 30 employing vehicle speed 28 and an effective road wheel position 102. Where the effective road wheel position 102 is configured to be proportional to the HWA 22. In an exemplary embodiment, the effective road wheel position 102 comprises the HWA 22 divided by the steering gear ratio ($K_{gr}$) minus the commanded open loop RWA 57. Employing an effective road wheel position 102 minimizes the storage space required for the look-up table 100 and facilitates tuning or adjustment of the look up table 100 as a function of changes in the rear wheel steering. Moreover, and more importantly, this reconfiguration yields a look-up table 100 that is independent of the configuration and tuning of the rear wheel steering. It should be appreciated that while a look-up table has been disclosed and described herein, other implementations will now be readily apparent. For example, look-up tables, partial look-up tables, direct computation, scaling, scheduling, and the like, as well as combinations including at least one of the foregoing.

For background on the new approach to deriving the expected yaw rate for the vehicle, the text *Fundamentals of Vehicle Dynamics* pp. 199–202, and 301–302 by Thomas D. Gillespie is used as a basic reference. In equation 6–16 (p. 202) of the referenced text, the relationship for steady state cornering is shown to be:

$$\delta = 57.3 * L/V + K_{us} * a_y \qquad \text{(eq. 4)}$$

where:
  $\delta$=steer angle at front wheels (deg)
  L=wheelbase (ft)
  R=radius of turn (ft)
  $K_{us}$=understeer gradient (deg/g)
  $a_y$=lateral acceleration (g)

By the laws of physics the yaw rate on a controlled vehicle will be:

$$\gamma_{ss} = 57.3 * V/R \qquad \text{(eq. 5)}$$

where:
  $\gamma_{ss}$=steady-state vehicle yaw rate
  V=forward speed (ft/sec)

Thus by substitution, the vehicle yaw rate may be expressed as:

$$\gamma_{ss} = V/L * (\delta - K_{us} * a_l) \qquad \text{(eq. 6)}$$

Figure 5:
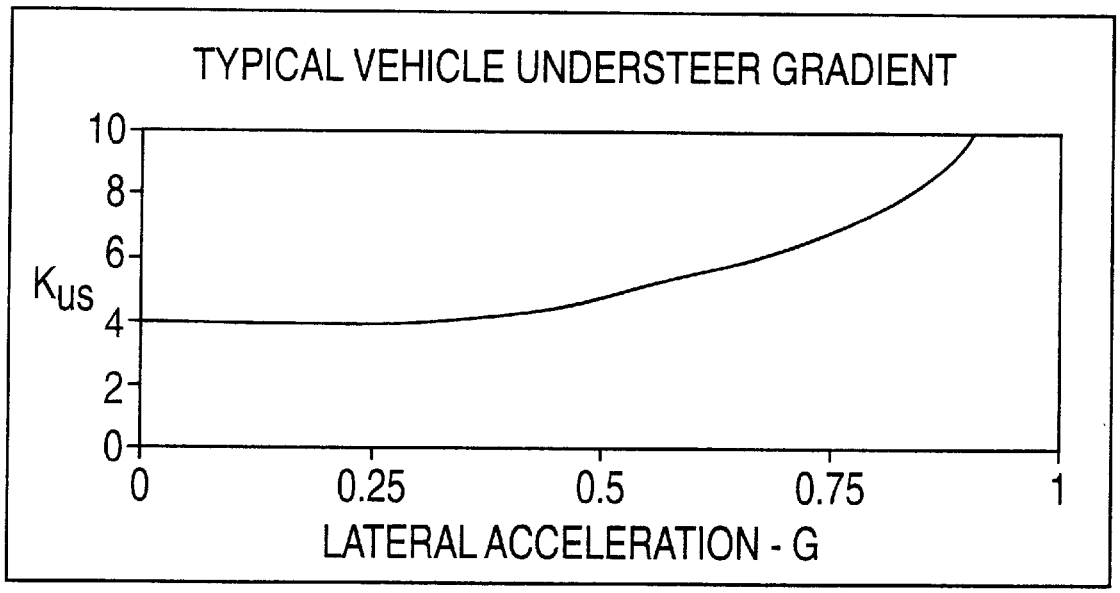
FIG. 5 depicts an example of the relationship between understeer gradient ($K_{us}$) and lateral acceleration.

This will not be a linear relationship since the understeer gradient ($K_{us}$) will increase with lateral acceleration FIG. 5 depicts an example of the relationship between understeer gradient ($K_{us}$) and lateral acceleration. The steer angle at the front wheels is related to the steering angle position as:

$$\delta_f = \theta/K_{gr} \qquad \text{(eq. 7)}$$

where:
  $K_{gr}$=steering gear ratio

Also from Gillespie's textbook in equation 8–14, he shows for low speed operation the following relationship exists for a four wheel steered vehicle:

$$\delta_f - \delta_r = 57.3 * L/R \qquad \text{(eq. 8)}$$

where
  $\delta_f$=steer angle at front wheels
  $\delta_r$=steer angle at rear wheels (keeping SAE sign convention)

Since it can be further shown that the lateral acceleration may be expressed as:

$$a_l = 57.3 * \gamma_{ss} * (V/G) \qquad \text{(eq. 9)}$$

where:
  G=acceleration of gravity (32.2 ft/sec/sec)

Equations 6 through 9 may be used to show the following relationship exists for the expected vehicle yaw rate $$\gamma_{ss} = \left( \frac{\delta * V}{L + \frac{57.3}{G} * K_{us} * V^2} \right) \qquad \text{(eq. 10)}$$

with $$\delta = \theta_m/K_{gr} - \delta_r$$

where the term $\delta$ is the effective road wheel angle position, (herein denoted 102), which combines the steering wheel position, $\theta_m$ (herein also denoted HWA 22) with the desired open loop rear steer angle, $\delta_r$ (herein also denoted RWA 57). This invention is also applicable to front controlled steering systems where the hand wheel position set by the driver may be modified by actuator control to provide an additional open-loop increment to the driver input. This correction could provide such features as allowing the gear ratio for the front steer to be variable with vehicle speed or otherwise changing the vehicle handling characteristics over the operating range of speeds. For a front-controlled steering system the form of equation 10 would change to become:

$$\delta = \frac{\theta_m + \theta_{ol}}{K_{gr}}$$

Here the desired open loop hand wheel position correction, $\theta_{ol}$ adds to the driver handwheel input, $\theta_m$.

Equation (10) shows the desired yaw rate term to be a function of the road-wheel angle and vehicle velocity. Since the understeer gradient $K_{us}$ is highly non-linear at larger values of lateral acceleration, the use of a look-up table to determine the value for desired yaw rate is a computational technique that is most readily implemented.

Figure 6:
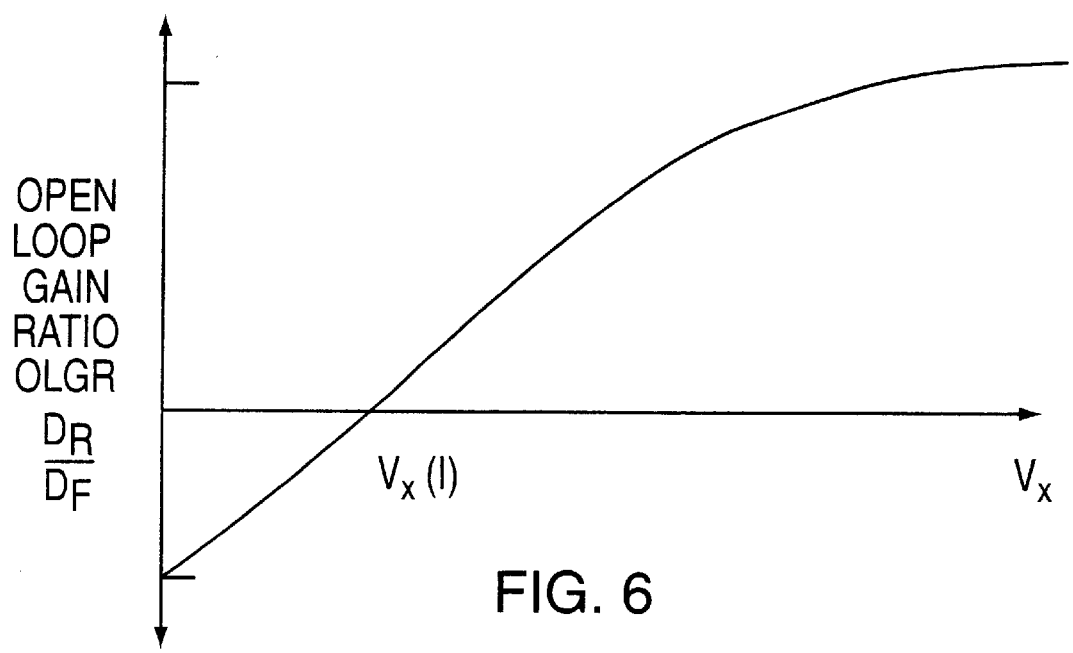
FIG. 6 depicts an exemplary open-loop relationship between the front wheel angle and the rear wheel angle.

From equation (10) it may be ascertained that a single look-up table may be utilized for ascertaining desired steady state yaw rate 30. Moreover a single look-up table may be employed even when changes are mandated in the open-loop relationship between the front wheel angle and the rear wheel angle for a VSE system 10 in a four-wheel steered vehicle. FIG. 6 depicts an exemplary open-loop relationship between the front wheel angle and the rear wheel angle for a VSE system 10 in a four-wheel steered vehicle.

Figure 7:
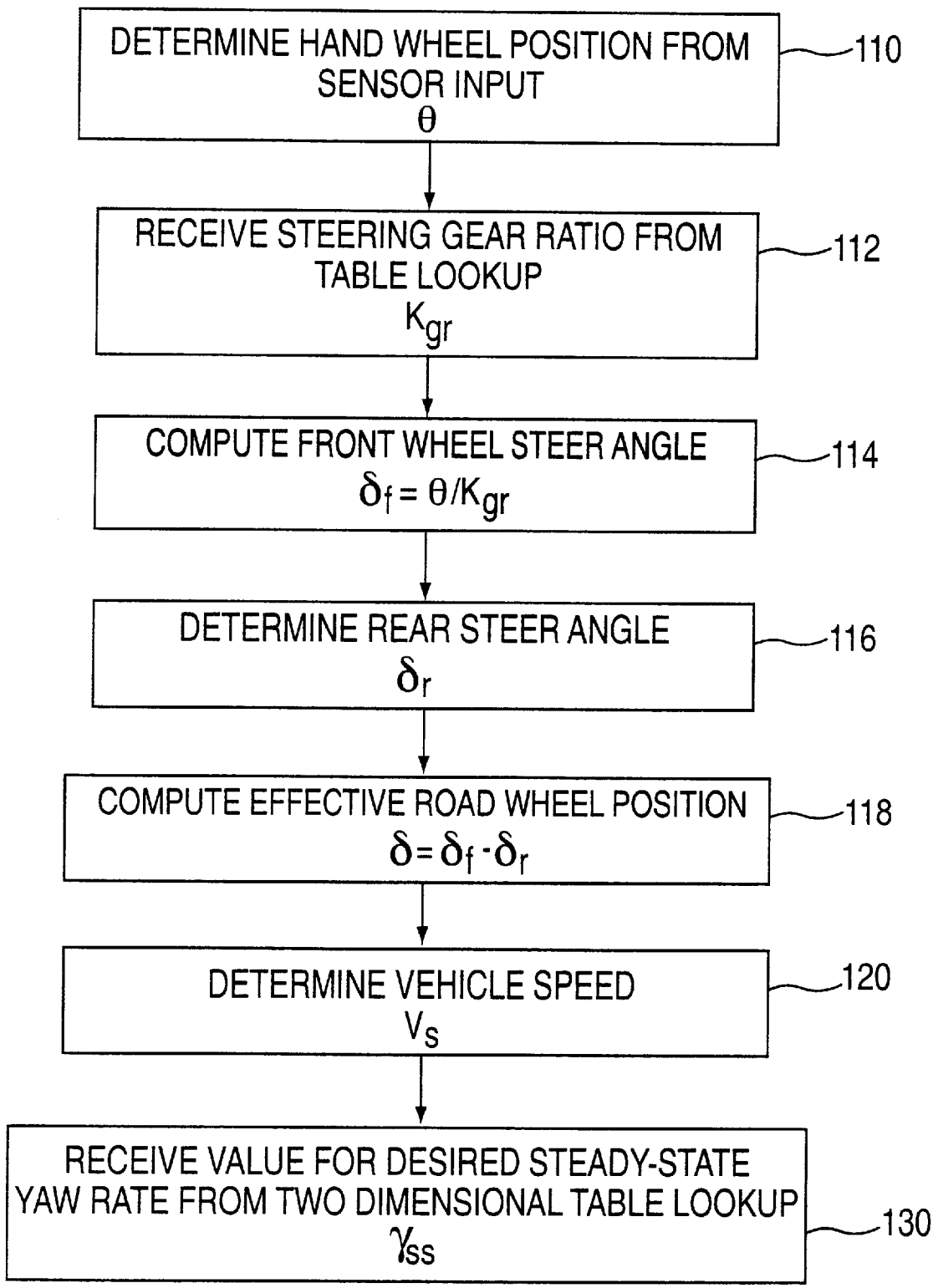
FIG. 7 is a flow diagram of an alternative embodiment.

Turning now to FIG. 7, a flowchart depicting the process for determining the desired steady state yaw rate 30 in accordance with this alternative exemplary embodiment and as depicted in FIG. 4. Beginning at block 110, hand wheel angle HWA 22 is obtained. Thereafter, at block 112 the steering gear ratio (N) is obtained from a table lookup. Once again as mentioned above, the front steer angle denoted $\delta_f$ is computed at block 114 utilizing the obtained values for hand wheel angle HWA 22 and steering gear ratio ($K_{gr}$). At block 116 the rear steer angle, in this embodiment, the desired RWA 57 is obtained for the selected operating mode. In an exemplary embodiment it is derived from a look-up table, which utilizes the desired relationship between the hand wheel angle HWA 22 and vehicle speed as depicted in FIG. 6. Turning to block, 118 the effective road wheel position 102 is computed as described above. At block 120 the vehicle speed ($V_x$) is determined. Then, algorithm proceeds to block 130 for the calculation of the steady state yaw rate, $\gamma_{ss}$ in accordance with equation (10).

Through the use of the above described invention embodiments, a vehicle stability enhancement system may be adaptable to accommodate new, multimode steering systems. This is accomplished, in part, by providing the flexibility for automatic adjustment of the calculation for the desirable handling motion for a given mode of operation in systems such as four-wheel steering, front controlled steering, and active roll control.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as a data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for automatically adjusting a vehicle stability enhancement (VSE) system, the method comprising:

configuring a reference model within the VSE system to generate desired vehicle handling aspects, said desired vehicle handling aspects being a function of one or more driver inputs to a steering system; and determining which of a plurality of driver-selectable steering modes associated with the steering system is activated;

wherein each of said desired vehicle handling aspects generated is further dependent upon a specific steering mode selected; and wherein said desired vehicle handling aspects comprise a desired steady state yaw rate; and said one or more driver inputs comprises an effective road wheel position.

2. The method of claim 1 wherein said one or more driver inputs further comprise:

a handwheel angle (HWA); and a vehicle speed.

3. The method of claim 2 further comprising:

configuring a lookup table for generating each of said desired vehicle handling aspects wherein said look up table includes entries corresponding to said specific steering mode selected.

4. The method of claim 3 wherein said lookup table corresponding to said desired steady state yaw rate having said effective road wheel position as a first input thereto, and said vehicle speed as a second input thereto.

5. The method of claim 2 wherein said effective road wheel position is responsive to at least one of: said hand wheel angle, a steering gear ratio, and a commanded open loop rear wheel angle.

6. A storage medium, comprising:

computer program code comprising:

instructions for causing a computer to implement a method for automatically adjusting a vehicle stability enhancement (VSE) system, the VSE system used in conjunction with a steering system, the method comprising:

configuring a reference model within the VSE system to generate desired vehicle handling aspects, said desired vehicle handling aspects being a function of one or more driver inputs to a steering system; and determining which of a plurality of driver-selectable steering modes associated with the steering system is activated;

wherein each of said desired vehicle handling aspects generated is further dependent upon a specific steering mode selected; and wherein said desired vehicle handling aspects comprises a desired steady state yaw rate; and said one or more driver inputs comprises an effective road wheel position.

7. The storage medium of claim 6 wherein said one or more driver inputs further comprise:

a handwheel angle (HWA); and a vehicle speed.

8. The storage medium of claim 7 further comprising: configuring a lookup table for generating each of said desired vehicle handling aspects wherein said look up table is configured to include entries corresponding to said specific steering mode selected.

9. The storage medium of claim 8 wherein:

said lookup table corresponding to said desired steady state yaw rate having said effective road wheel position as a first input thereto, and said vehicle speed as a second input thereto.

10. The storage medium of claim 6 wherein said effective road wheel position is responsive to at least one of: said hand wheel angle, a steering gear ratio, and a commanded open loop rear wheel angle.

11. A computer data signal, comprising:
code configured to cause a processor to implement a method for automatically adjusting a vehicle stability enhancement (VSE) system, the method further comprising:
configuring a reference model within a VSE system to generate desired vehicle handling aspects, said desired vehicle handling aspects being a function of one or more driver inputs to the steering system; and
determining which of a plurality of driver-selectable steering modes associated with the steering system is activated;
wherein each of said desired vehicle handling aspects generated is further dependent upon a specific steering mode selected;
wherein said desired vehicle handling aspects comprises a desired steady state yaw rate; and said one or more driver inputs comprises an effective road wheel position.

12. The computer data signal of claim 11 wherein said one or more driver inputs further comprise:
a handwheel angle (HWA); and
a vehicle speed.

13. The computer data signal of claim 12 further comprising: configuring a lookup table for generating each of said desired vehicle handling aspects wherein said look up table is configured to include entries corresponding to said specific steering mode selected.

14. The computer data signal of claim 13 wherein:
said lookup tables corresponding to said desired steady state yaw rate having said effective road wheel position as a first input thereto, and said vehicle speed as a second input thereto.

15. The computer data signal of claim 12 wherein said effective road wheel position is responsive to at least one of: said hand wheel angle, a steering gear ratio, and a commanded open loop rear wheel angle.

16. A vehicle stability enhancement (VSE) system, comprising:
a reference model configured to generate desired vehicle handling aspects, said desired vehicle handling aspects being a function of one or more driver inputs to a steering system, said steering system having a plurality of driver-selectable steering modes associated therewith;
a vehicle state estimator, said vehicle state estimator accepting vehicle inputs thereto and generating vehicle parameter estimations therefrom; and
a vehicle control block, said vehicle control block receiving said desired vehicle handling aspects and said vehicle parameter estimations as inputs thereto, and said vehicle control block further generating vehicle control outputs to be applied to said steering system;
wherein each of said desired vehicle handling aspects generated is further dependent upon a specific driver-selectable steering mode selected; and
wherein said desired vehicle handling aspects comprises a desired steady state yaw rate and said one or more driver inputs comprises an effective road wheel position.

17. The VSE system of claim 16 wherein said one or more driver inputs further comprise:
a handwheel angle (HWA); and
a vehicle speed.

18. The VSE system of claim 17, further comprising:
a lookup table configured for generating each of said desired vehicle handling aspects, and wherein each said lookup table is configured to include entries corresponding to said specific steering mode selected.

19. The VSE system of claim 18 wherein said lookup table corresponds to said desired steady state yaw rate having said effective road wheel position as a first input thereto, and said vehicle speed as a second input thereto.

20. The VSE system of claim 17 wherein said effective road wheel position is responsive to at least one of: said hand wheel angle, a steering gear ratio, and a commanded open loop rear wheel angle.

* * * * *